United States Patent
Yi et al.

(10) Patent No.: US 10,235,795 B2
(45) Date of Patent: Mar. 19, 2019

(54) METHODS OF COMPRESSING A TEXTURE IMAGE AND IMAGE DATA PROCESSING SYSTEM AND METHODS OF GENERATING A 360 DEGREE PANORAMIC VIDEO THEREOF

(71) Applicant: VIA Alliance Semiconductor Co., Ltd., Shanghai (CN)

(72) Inventors: Yiting Yi, Shanghai (CN); Gong Chen, Shanghai (CN); Rong Xie, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 15 days.

(21) Appl. No.: 15/599,838

(22) Filed: May 19, 2017

(65) Prior Publication Data
US 2018/0322685 A1 Nov. 8, 2018

(30) Foreign Application Priority Data
May 5, 2017 (CN) .......................... 2017 1 0311245

(51) Int. Cl.
*G06T 15/04* (2011.01)
*G06T 3/40* (2006.01)
(Continued)

(52) U.S. Cl.
CPC ............ *G06T 15/04* (2013.01); *G06T 3/4038* (2013.01); *G06T 7/30* (2017.01); *H04N 19/119* (2014.11);
(Continued)

(58) Field of Classification Search
CPC .............................. G06T 15/04; H04N 19/119
See application file for complete search history.

(56) References Cited

U.S. PATENT DOCUMENTS 7,483,590 B2 * 1/2009 Nielsen ................. G06T 3/0062
382/285
2003/0095131 A1 * 5/2003 Rondinelli ............ G06T 3/0062
345/582
(Continued)

FOREIGN PATENT DOCUMENTS

CN 102426703 A 4/2012
CN 102982516 A 3/2013
(Continued)

OTHER PUBLICATIONS

Pekofsky et al., WO 2014/043814 A1, Mar. 27, 2014, pp. 1-63 (Year: 2014).*

*Primary Examiner* — Samantha (Yuehan) Wang
(74) *Attorney, Agent, or Firm* — McClure, Qualey & Rodack, LLP

(57) ABSTRACT

A method of compressing a texture image for use in generating a 360 degree panoramic video is provided. The method including the steps of: receiving an original texture image for a sphere model, wherein the original texture image is an image with a rectangular shape and includes a plurality of pixel lines and each of the pixels lines has a corresponding spherical position on the sphere model; determining a compression ratio of each of the pixel lines according to the corresponding spherical position of each of the pixel lines; and compressing the pixel lines with the compression ratios corresponding thereto to generate a compressed texture image with a non-rectangular shape, wherein the compressed texture image is further being mapped to the sphere model to generate the 360 degree panoramic video.

14 Claims, 11 Drawing Sheets

(51) Int. Cl.
*G06T 7/30* (2017.01)
*H04N 19/176* (2014.01)
*H04N 19/119* (2014.01)
*G06T 7/529* (2017.01)
*G06T 7/44* (2017.01)
*H04N 13/261* (2018.01)

(52) U.S. Cl.
CPC .............. *H04N 19/176* (2014.11); *G06T 7/44* (2017.01); *G06T 7/529* (2017.01); *G06T 2207/10024* (2013.01); *H04N 13/261* (2018.05)

(56) References Cited

U.S. PATENT DOCUMENTS

2004/0169726 A1  9/2004  Moustier et al.
2008/0303814 A1* 12/2008  Ishiyama ........... G06K 9/00214
                                                    345/419

FOREIGN PATENT DOCUMENTS

| CN | 103493105 A | 1/2014 |
| CN | 103905761 A | 7/2014 |
| CN | 106131540 A | 11/2016 |
| CN | 106412582 A | 2/2017 |
| EP | 2 518 686 A1 | 10/2012 |
| TW | 201601115 A | 1/2016 |

\* cited by examiner

METHODS OF COMPRESSING A TEXTURE IMAGE AND IMAGE DATA PROCESSING SYSTEM AND METHODS OF GENERATING A 360 DEGREE PANORAMIC VIDEO THEREOF

CROSS REFERENCE TO RELATED APPLICATIONS

This application claims priority of China Application No. 201710311245.X, filed on May 5, 2017, and the entirety of which is incorporated by reference herein.

BACKGROUND OF THE INVENTION

Field of the Invention

The invention generally relates to image processing, and more particularly, to an image data processing system for processing a texture image of a panoramic video and related methods of compressing a texture image and methods of generating a 360 degree panoramic video thereof.

Description of the Related Art

With the development of computer technology and the progress of image drawing technology, applications of panorama images and 360 degree panoramic video have become more and more popular. A panorama image where a plurality of images may be combined or stitched together to increase the field of view (FOV) without compromising resolution is an image with an unusually large field of view, an exaggerated aspect ratio, or both. A panorama image, sometimes also called simply a "panorama", can provide a 360 degree view of a scene. A 360 degree panoramic video is a set of video collections with 360 degree view in both horizontal and vertical directions, and a viewer's viewing angle is in a central perspective so that an active viewing can be provided to the viewers in response to the viewer perspective viewpoint and viewing angle to achieve a goal for where to see where it is viewed. Such immersive experience surrounded by the environment allows the viewers to experience an immersive experience personally. In current applications, different texture images can be constructed primarily by three models, such as a sphere model, a cylindrical model, or a cube model. Among them, the sphere model is often used to construct different texture images because a surface area of the sphere model is smaller than that of the cylindrical model and the cube model.

Generally speaking, the texture image is a digital image with a rectangular shape and has a coordinate space on which coordinates are labeled as (U,V). The texture image can be assigned to a set of coordinates (U, V) according to its location. In a texture image mapping, when a 3D image model is rendered to generate a target image, a texture is mapped onto the surface of the model being used. The spherical texture image utilized by the prior art is a specially processed image, which is generated by capturing a plurality of images by multiple video cameras at the same time, for example, by a plurality of cameras simultaneously photographing a plurality of pictures of a room in various angles, dynamically recording captured images in all directions, stitching them through the late professional stitching software to obtain a stitched image, and specially processing the stitched image to generate the spherical texture image suitable for applying to the surface of the sphere. During transmission, the flat video is sequentially transmitted by one of frames of a two-dimensional image, and each frame of the transmitted two-dimensional image is then sequentially attached to the sphere model frame by frame, wherein the texture image of each frame transmitted within the video stream is used as the texture image of the sphere model to perform a conversion operation from the two-dimensional image to a three-dimensional space, and render scene changes of the three-dimensional space in real-time to form dynamic effects of the three-dimensional space, so as to generate a 360 degree panoramic video and generate a playback effect for playing a 360 degree panoramic video.

Typically, texture image mapping often consumes a large amount of transmission bandwidth. Thus, in the prior art, texture images will be first compressed to reduce the required bandwidth. In the prior art, a rectangular image is typically used as the texture image of the sphere model. The texture image being used may be an image with an aspect ratio of 2:1, in which its width is being mapped to a circumference of a sphere at the equator and its height is being mapped to a length of connecting the longitude line at the North pole and the longitude line at the South pole on the sphere model. In the texture sampling stage, color values are sampled within the width range of the rectangular texture image on 0 degree latitude at the equator of the sphere, and color values are also sampled within the width range of the rectangular texture image on 90 degrees latitude at the North and South poles of the sphere (i.e., a (circle) ring of the 0 degree latitude and a (circle) ring of 90 degrees latitude are mapped into the same area size of the texture image). Accordingly, an area of the sampled area on the texture image corresponding to a viewport which is located close to the equator of the sphere is smaller than the area of the sampled area on the texture image corresponding to a viewport which is located close to the South pole or North pole of the sphere, so that color values of points located close to the South pole or North pole of the sphere may be mapped to the color values within the texture image width range on the texture image. If taking the texture resolutions for the points of texture image being sampled whose positions are close to the equator of the sphere as a benchmark, it can be thought that information redundancy is occurred for texture values of points of texture image being sampled whose positions are close to the South or North pole of the sphere. Therefore, there may have too much redundant information on the North and South poles when the texture images are applied to the sphere model, and such redundant information may also waste unnecessary transmission bandwidth.

BRIEF SUMMARY OF THE INVENTION

Methods of compressing a texture image and related image data processing system and method of generating a 360 degree panoramic video thereof are provided.

In an exemplary embodiment, a method of compressing a texture image for use in generating a 360 degree panoramic video is provided. The method comprises the steps of: receiving an original texture image for a sphere model, wherein the original texture image is an image with a rectangular shape and includes a plurality of pixel lines and each of the pixels lines has a corresponding spherical position on the sphere model; determining a corresponding compression ratio of each of the pixel lines according to the corresponding spherical position of each of the pixel lines; and compressing the pixel lines with the compression ratios corresponding thereto to generate a compressed texture image with a non-rectangular shape, wherein the compressed texture image is further being mapped to the sphere model to generate the 360 degree panoramic video.

Another exemplary embodiment of an image data processing system at least comprises a storage unit and a processor. The storage unit is configured to store at least one original texture image for a sphere model, wherein the original texture image is an image with a rectangular shape and includes a plurality of pixel lines and each of the pixels lines has a corresponding spherical position on the sphere model. The processor is coupled to the storage unit and configured to receive the original texture image, determine a corresponding compression ratio of each of the pixel lines according to the corresponding spherical position of each of the pixel lines, and compress the pixel lines with the compression ratios corresponding thereto to generate a compressed texture image with a non-rectangular shape and store the compressed texture image into the storage unit.

In yet another exemplary embodiment, a method of generating a 360 degree panoramic video is provided, the method comprising the steps of: receiving a compressed texture image, wherein the compressed texture image has a plurality of pixel lines i, each of the pixel lines i comprising a first number of pixels and each of the pixel lines i having a plurality of parameter values, wherein the parameter values of each pixel line i comprise the number of pixels being sampled, a first index value, and a second index value for the pixel line i; performing a texture coordinate mapping according to the parameter values of each pixel line i to obtain mapping texture coordinates of the pixel line i; configuring attributes of texture coordinates of each subdivided triangle on a sphere model based on the parameter values for each pixel line i; and mapping each pixel line i of the compressed texture image to a corresponding position on the sphere model based on the parameter values and the mapping texture coordinates for the pixel line i to generate the 360 degree panoramic video.

The above-described methods may be practiced by the disclosed apparatuses or systems which are suitable firmware or hardware components capable of performing specific functions. Methods may also take the form of a program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. It should be understood that the embodiments may be realized in software, hardware, firmware, or any combination thereof.

Embodiments of the invention provide a method of compressing a texture image and associated image data processing system and method of generating a 360 degree panoramic video thereof, which can determine a compression ratio of each of pixel lines on the texture image according to the different circumferences of rings of latitude line of the respective pixels on the sphere to compress original texture image which is a texture image with a rectangular shape utilized in the prior art into a texture image with an non-rectangular shape (e.g., an approximate elliptical texture image) so as to achieve the isotropic of the resolution on the sphere in all orientations, thus effectively solving the problem of excessive redundancy information sampled at the North and South poles of the texture image in the prior art.

Figure 1:
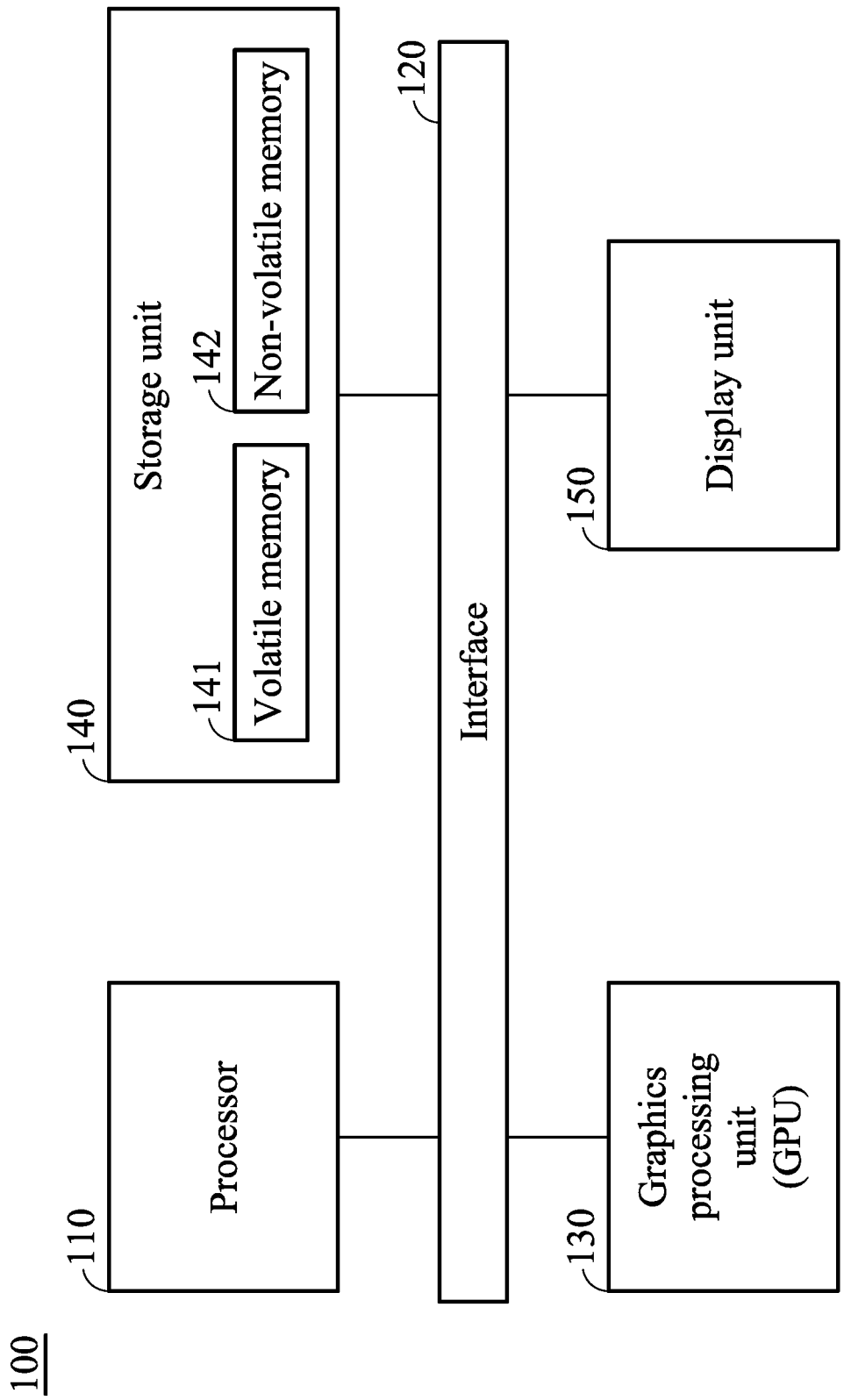
FIG. 1 is a diagram of an image data processing system in accordance with an embodiment of the invention.

FIG. 1 is a diagram of an image data processing system in accordance with an embodiment of the invention. The image data processing system 100 can be a desktop computer, an All-In-One (AIO) computer, a notebook, a notebook with a touch panel, or a portable device or a handheld device (e.g., a PDA, a smartphone, a tablet computer, a mobile phone, an Mobile internet device (MID), a laptop computer, a car computer, a digital camera, a multimedia player or a game device, or any other type of mobile computational device) capable of processing image or video data or can be provided by more than one device. However, it is to be understood that the invention is not limited thereto. In some embodiments, the image data processing system 100 can also be implemented as multiple chips or a single ship such as a system on chip (SOC) or a mobile processor disposed in a mobile device. For example, the image data processing system 100 comprises at least one of a processor 110, an interface 120, a graphics processing unit (GPU) 130, a storage unit 140 and a display device 150. The processor 110, the GPU 130, the storage unit 140 and the display device 150 can be coupled to each other through the interface 120. For example, in one embodiment, the interface 120 may be a system bus that couples a variety of system components such as the GPU 130, the storage unit 140 and the display device 150 to the processor 110.

The processor 110 may be a Central Processing Unit (CPU), a general-purpose processor, a Micro-Control Unit (MCU), a Digital Signal Processor (DSP), or any equivalent circuitry for providing the functionalities of data analysis, processing and computing, but the disclosure is not limited thereto. The storage unit 140, for example, may include a volatile memory 141 and a non-volatile memory 142 for storing related data, such as intermediate data generated during the calculation process and the execution result information and so on. The volatile memory 141 may be a dynamic random access memory (DRAM) or a static random access memory (SRAM), and the non-volatile memory 142 may be a Read-Only Memory (ROM), a flash memory, a hard disk, a solid-state disk (SSD), etc. The storage unit 140 may also store instruction sets and/or program code modules that can be executed by the processor 110 and the GPU 130. Generally speaking, program code modules contain routines, programs, objects, components, and so on. For example, the program codes of the applications for use on the image data processing system 100 can be pre-stored in the non-volatile memory 142. The processor 110 may load program codes of applications from the non-volatile memory 142 to the volatile memory 141, and execute the program code of the applications. The processor 110 may also transmit the graphics data to the GPU 130, and the GPU 130 may determine the graphics data to be rendered on the display device 150. It is noted that although the volatile memory 141 and the non-volatile memory 142 are illustrated as a memory unit, they can be implemented separately as different memory units.

The display device 150 can be a display circuit or hardware that can be coupled for controlling a display (not shown). The display device 150 may include either or both of a driving circuit and a display panel and can be disposed internal or external to the image data processing system 100. The display device 150 can display related data, such as texts, figures, interfaces, and/or information such as displaying or presenting operation results. The display device 150 may be configured to present a screen of the results, such as a Liquid-Crystal Display (LCD). It should be understood that, in some embodiments, the display device 150 may be a screen integrated with a touch-sensitive device (not shown). The touch-sensitive device has a touch-sensitive surface comprising sensors in at least one dimension to detect contact and movement of at least one input tool, such as a pen/stylus or finger near or on the touch-sensitive surface. Accordingly, users are able to input commands or signals via the display device 150.

In some embodiments, the image data processing system 100 may further include an image input interface (not shown) for receiving source images, such as original texture image data or video data. In one embodiment, the image input interface can be equipped with image capture devices for capturing the source images. The image capture devices may comprise imaging sensors which may be a single sensor or a sensor array including a plurality of individual or separate sensor units. For example, the image capture devices can be multiple cameras with a fisheye lens. In another embodiment, the image input interface can receive the source images from external image capture devices. The image input interface can obtain source images (e.g., fisheye images) and provide the source images to the processor 110.

In some embodiment, the processor 110 may further include an encoder (not shown) to obtain the source images and encode the source images to generate encoded image, such as encoded video bitstream, in any suitable media format compatible with current video standards such as the H.264 (MPEG-4 AVC) or H.265 standard. The encoder may be, for example, a standard image/video encoder or an image/encoder with pre-warping function, but the disclosure is not limited thereto. When the encoder is the image/video encoder with pre-warping function, it may further perform a remapping or warping operation on the encoded video bitstream during encoding to remove distortion on the original source images or video data. In some embodiments, the processor 110 may further include a decoder (not shown) to decode the encoded video bitstream to obtain the source images using a suitable media format compatible with the video standard used by the encoded video bitstream such as the H.264 (MPEG-4 AVC) or H.265 standard.

In some embodiments, although not shown, the image data processing system 100 may comprise other functional units, such as a keyboard/keypad, a mouse, a touchpad, or a communication unit, such as an Ethernet card/chipset, a Wireless-Fidelity (WiFi) card/chipset, a baseband chipset and a Radio Frequency (RF) chipset for cellular communications.

The processor 110 may be used to load and execute a series of instructions and/or program codes from the storage unit 140 to control the operations of the storage unit 110 and the display device 150 to perform the method of compressing a texture image of the invention, including the steps of: receiving an original texture image for a sphere model, wherein the original texture image is an image with a rectangular shape and includes a plurality of pixel lines and each of the pixels lines has a corresponding spherical position on the sphere model; determining a compression ratio of each of the pixel lines according to the corresponding spherical position of each of the pixel lines; and compressing the pixel lines with the compression ratios corresponding thereto to generate a compressed texture image with a non-rectangular shape, wherein the compressed texture image is further being mapped to the sphere model to generate a 360 degree panoramic video, the details of which will be described more in the following paragraphs.

Figure 2:
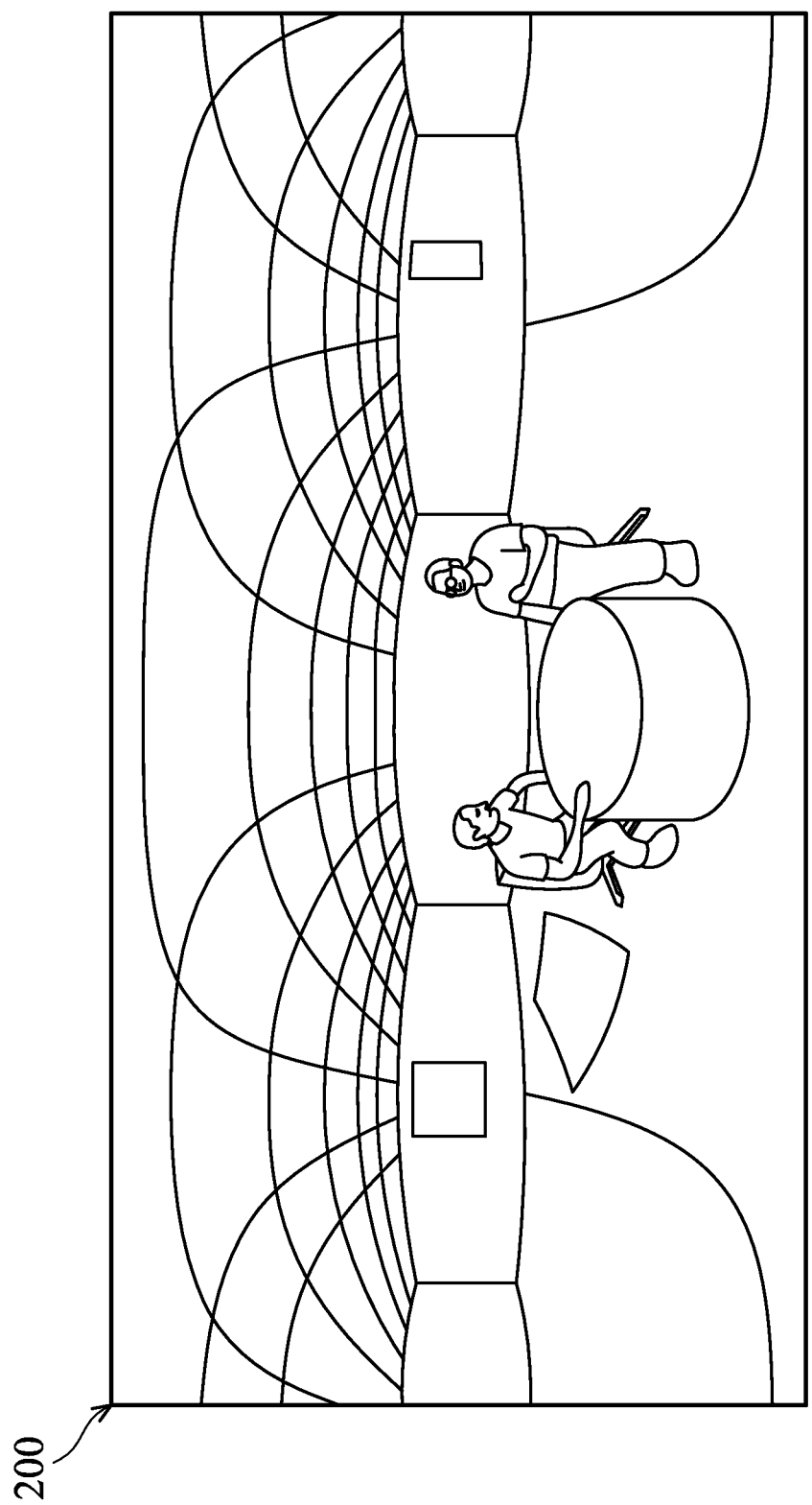
FIG. 2 is a diagram of an original texture image in accordance with an embodiment of the invention.

To be more specific, each original texture image is a rectangular image (an image with a rectangular shape) with a height value and a width value and the original texture image can then be utilized to generate a 360 degree panoramic video, as shown in FIG. 2. FIG. 2 is a diagram of an original texture image 200 in accordance with an embodiment of the invention. As shown in FIG. 2, the original texture image 200 may be a rectangular image with an aspect ratio of 2:1, which is a specially processed texture image suitable for applying to the sphere surface and its width is being mapped to a circumference of a sphere at the equator and its height is being mapped to a length of connecting the longitude line at the North pole and the longitude line at the South pole on the sphere model. Each original texture image can be divided in the same way. In addition, the original texture image may be stored in the storage unit 140, for example, stored in the volatile memory 141. The volatile memory 141 may store corresponding information for each pixel of the original texture image 200, such as a pixel value of each pixel and the pixel line and the corresponding pixel position in the pixel line on which the pixel located and so on.

In the texture sampling stage of this embodiment, the original texture image 200 may be divided into a plurality of pixel lines by latitude and each pixel line has a corresponding spherical position on the sphere model. For example, color values are sampled within the width range of a first pixel line of the original texture image 200 on 0 degree latitude at the equator of the sphere, and color values are also sampled within the width range of a second pixel line of the original texture image 200 on 90 degrees latitude at the North and South poles of the sphere (i.e., a ring of the 0 degree latitude and a ring of 90 degrees latitude are mapped into the same area size of the original texture image 200).

Thus, there may have too much redundant information on the North and South poles when the original texture image 200 is applied to the sphere model to generate a 360 degree panoramic video. As mentioned above, the 360 degree panoramic video is a video set of video collections with 360 degree view in both horizontal and vertical directions, and the viewer's viewing angle is in a central perspective so that an active viewing can be provided to the viewers in response to the viewer perspective viewpoint and viewing angle to achieve a goal for where to see where it is viewed. Such immersive experience surrounded by the environment allows the viewers to experience an immersive experience personally. In this embodiment, the original texture image is mapped to a sphere model to generate the 360 degree panoramic video. Thus, in order to solve the foregoing problem, the processor 110 of the present invention can obtain the corresponding information for each pixel of the original texture image from the volatile memory 141 and determine a compression ratio of each pixel line on the texture image according to the different circumferences of rings of latitude line of the respective pixels on the sphere, so as to generate a compressed texture image. By doing so, the original texture image which is a texture image with a rectangular shape can be compressed into a texture image with an non-rectangular shape (e.g., an approximate elliptical texture image) to effectively solve the problem of excessive redundancy information sampled at the North and South poles of the texture image in the prior art.

Figure 3:
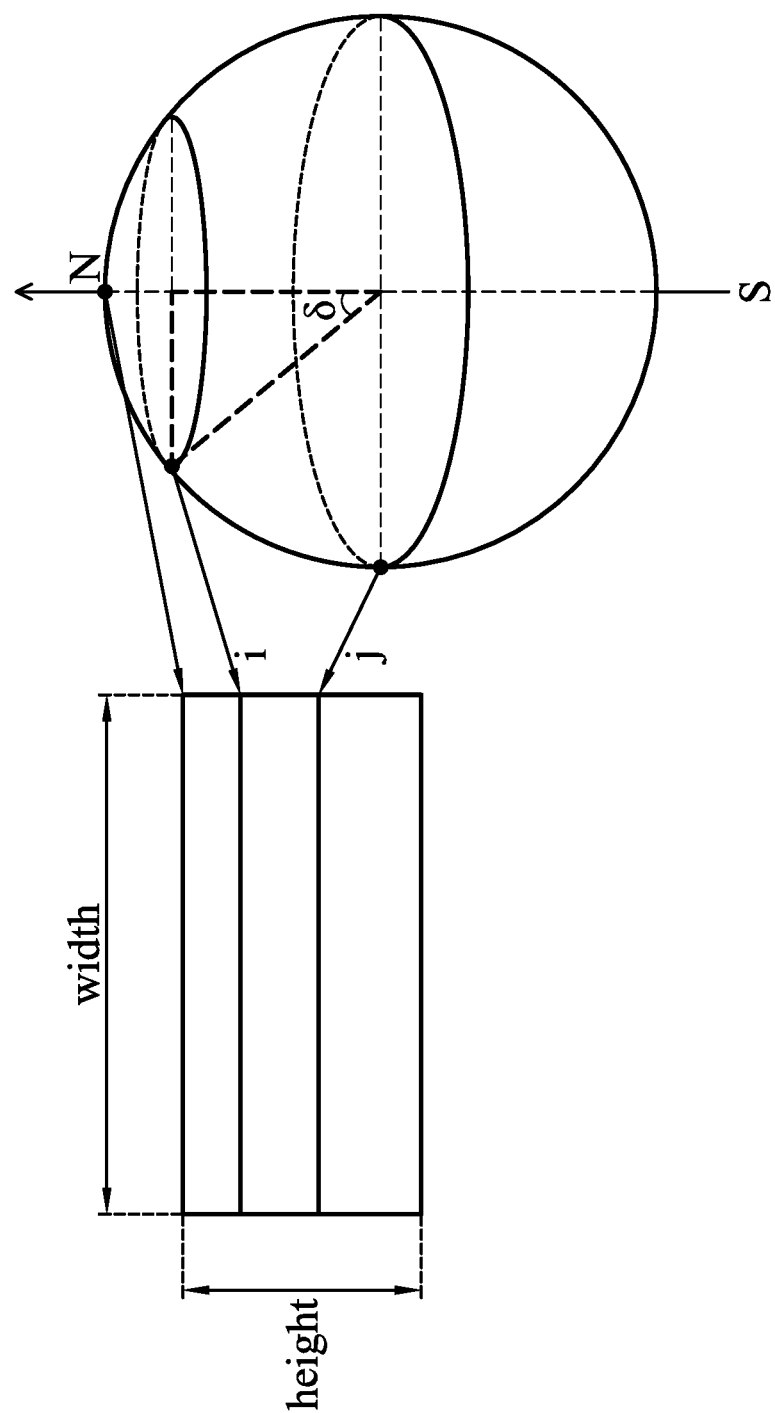
FIG. 3 is a diagram illustrating a mapping of pixel lines of the texture image to a sphere in accordance with an embodiment of the invention.

FIG. 3 is a diagram illustrating a mapping of pixel lines of the texture image to a sphere in accordance with an embodiment of the invention. As shown in FIG. 3, assume that the width value of the original texture image is "width", the height value of which is "height", and each pixel line (denoted as i in FIG. 3) on the original texture image is mapped to a respective ring of latitude line on the sphere, wherein the innermost pixel line of the original texture image (denoted as j in FIG. 3) is mapped onto the ring of latitude line of the sphere at the equator. Next, the processor 110 determines the number of pixels on each pixel line of the compressed texture image according to the circumference of ring of the latitude line, and the size of the ring of latitude line is linearly related to the height of the latitude line. For example, the size of the ring of latitude line is directly determined by an angle value of the δ angle as shown in FIG. 3. Therefore, by using the angle value of the angle δ and the width value "width" of the original texture image, the processor 110 may calculate the number of pixels for the i-th pixel line of the compressed texture image, PixelOfLine[i], by the following formulas (1), (2), and (3):

$$\theta = \frac{\pi}{(\text{height} - 1)}; \quad (1)$$

$$\delta = i * \theta; \quad (2)$$

and $$PixelOfLine[i] = \min((\sin(\delta) + \text{offset}) * \text{width}, \text{width}), \quad (3)$$

where width and height represent the width and height values of the original texture image, respectively, and offset represents an offset set for preserving the information at the North and South poles, which value is ranged from 0 to 1 (e.g., the offset is set to 0.05), wherein the value of the offset being set determines the effect of compression.

Thereafter, the processor 110 calculates a start index value StartPixel[i] and an end index value EndPixel[i] of effective pixels stored in the i-th pixel line of the compressed texture image by the following formulas (4) and (5), respectively, using the number of pixels for the i-th pixel line of the compressed texture image, PixelOfLine[i], calculated by the formula (3):

$$StartPixel[i] = \frac{(\text{width} - PixelOfLine[i])}{2}; \quad (4)$$

and $$EndPixel[i] = StartPixel[i] + PixelOfLine[i] - 1, \quad (5)$$

where the start index value StartPixel[i] and the end index value EndPixel[i] of the respective pixel line represent a pixel position of the starting pixel and a pixel position of the ending pixel within the corresponding pixel line on which the effective pixels are stored, respectively. That is, the start index value StartPixel [i] and the end index value EndPixel [i] represent a sampling range of the effective pixels for the i-th pixel line.

Thereafter, the processor 110 calculates a compression ratio ratio[i] of each pixel line i by the following formula (6) using the number of pixels for the i-th pixel line of the compressed texture image, PixelOfLine[i], calculated by the formula (3) and the width value width:

$$ratio[i] = \frac{\text{width}}{PixelOfLine[i]}. \quad (6)$$

Figure 4:
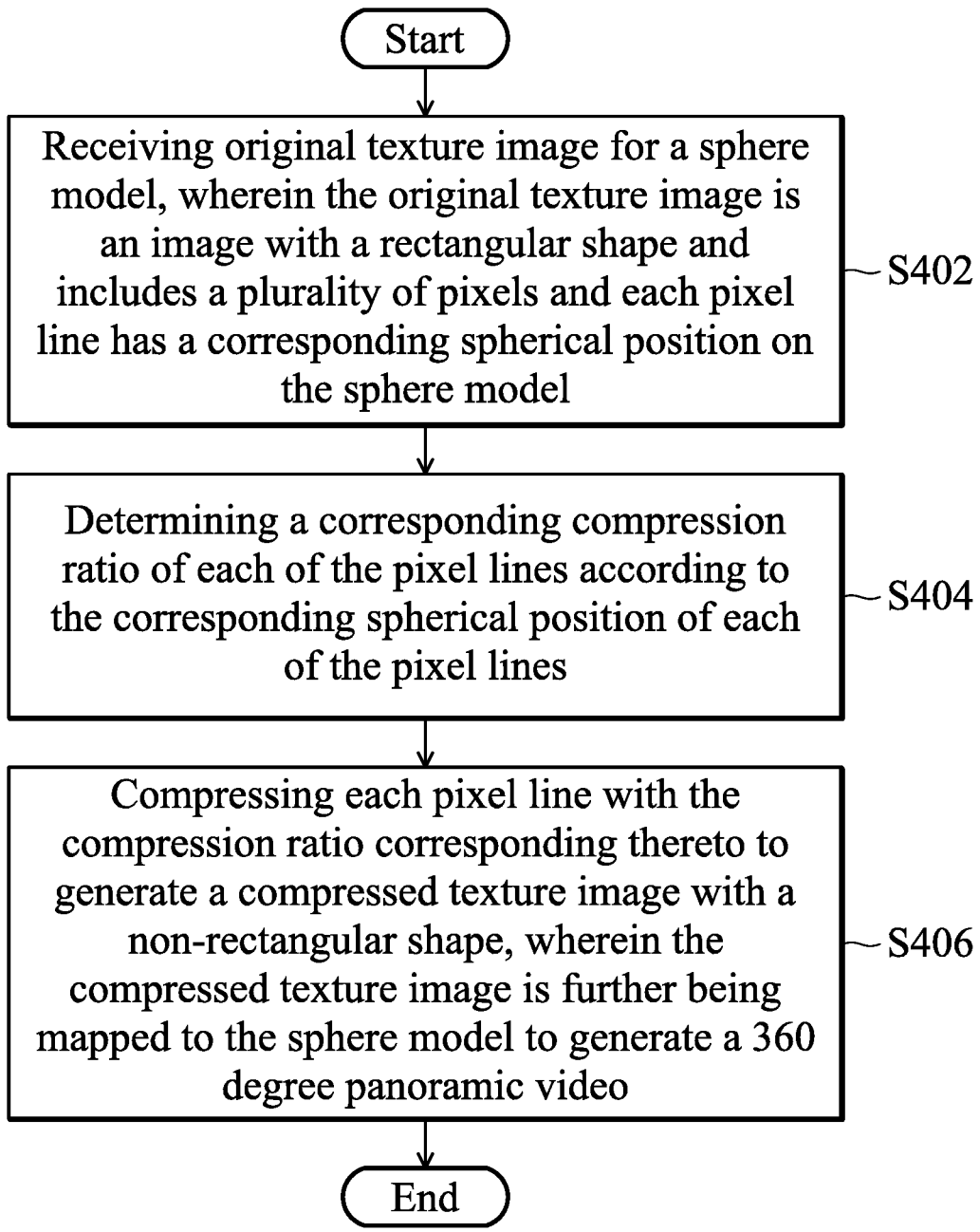
FIG. 4 is a flow chart of a method of compression a texture image in accordance with an embodiment of the invention.

FIG. 4 is a flow chart of a method of compression a texture image in accordance with an embodiment of the invention. The method of compression the texture image of the invention may be applied to an image data processing system, such as the image data processing system 100 as shown in FIG. 1 and performed by the processor 110.

First, in step S402, the processor 110 receives an original texture image for a sphere model, wherein the original texture image (such as the original texture image 200 as shown in FIG. 2) is a rectangular image which is an image with a rectangular shape and includes a plurality of pixels and each pixel line has a corresponding spherical position on the sphere model.

Next, in step S404, the processor 110 determines a corresponding compression ratio of each of the pixel lines according to the corresponding spherical position of each of the pixel lines. Note that the compression ratio indicates a difference amount of pixels between the original texture image and the compressed texture image, and the larger the compression ratio is, the greater the difference in the number of pixels is. To be more specific, the processor 110 may determine parameter values of each pixel line of the compressed texture image by the aforementioned formulas (1) to (6), such as the number of pixels PixelOfLine[i] for the i-th pixel line, the start index value StartPixel[i] and the end index value EndPixel[i] of the respective pixel line on the compressed texture image on which the effective pixels are stored, so as to determine the corresponding compression ratio ratio[i] of each pixel line accordingly.

In some embodiments, the original texture image may have a height value and a width value, and the sphere model may be divided into a plurality of rings of latitude line along the latitude line direction, wherein all the pixels at the same pixel line correspond to the location of a corresponding one of the rings of latitude line located on the sphere model. For each pixel line, the processor 110 may determine a corresponding ring of latitude line among the rings of latitude line according to the corresponding spherical position of each pixel line, determine the number of pixels based on the height value, the width value, and a circumference of the corresponding ring of latitude line, and determine the corresponding compression ratio of each pixel line according to the number of pixels of each pixel line and the width value, so as to determine the corresponding compression ratio of each pixel line according to the corresponding spherical position of each of the pixel lines, wherein the corresponding compression ratio of each pixel line is inversely proportional to the number of pixels of each pixel line. For example, the processor 110 may determine the number of pixels PixelOfLine[i] in the i-th pixel line of the compressed texture image by the formulas (1) to (3), obtain the start index value StartPixel[i] and the end index value EndPixel[i] for storing the effective pixels of the i-th pixel line in the original texture image by the formulas (4) and (5), and then determine the compression ratio of the pixel line i by the formula (6).

In some embodiments, the pixel lines comprise at least one first pixel line whose corresponding spherical position is close to one of two poles of the sphere model and at least one second pixel line whose corresponding spherical position is far away from the two poles of the sphere model, and the corresponding compression ratio of the first pixel line whose corresponding spherical position is close to one of two poles of the sphere model is larger than the corresponding compression ratio of the second pixel line whose corresponding spherical position is far away from the two poles of the sphere model. For example, in one embodiment, color values may be sampled within the width range of the first pixel line of the original texture image 200 on 0 degree latitude at the equator of the sphere, while color value sampling are performed only within a few portion of the width range of the second pixel line of the original texture image 200 on 90 degrees latitude at the North and South poles of the sphere.

In some embodiments, each pixel line of the original texture image has a corresponding pixel line in the compressed texture image, and the start index value and the end index value of each pixel line represent the starting pixel position and the ending pixel position for the effective pixels stored on the corresponding pixel line, respectively. In some embodiments, each pixel line of the original texture image includes a plurality of pixels in the corresponding pixel line of the compressed texture image and each pixel has a respective pixel position, and the processor 110 may further determine a pixel value for the respective pixel position of each pixel in the corresponding pixel lines based on the start index value and the end index value of each pixel line and the respective pixel position of the pixel.

It should be noted that the detail steps about how to determine parameter values of each pixel line of the compressed texture image, such as the number of pixels PixelOfLine[i] for the i-th pixel line, the start index value StartPixel[i] and the end index value EndPixel[i] on the i-th pixel line of the original texture image for the respective i-th pixel line of the compressed texture image on which the effective pixels are stored, by the aforementioned formulas (1) to (6) so as to determine the corresponding compression ratio ratio[i] of each pixel line accordingly may be referred to aforementioned description in generation of respective parameters using the foregoing formulas (1) to (6) and detailed are omitted here for brevity.

After determining the compression ratio for each pixel line, in step S406, the processor 110 then compresses each pixel line with the compression ratio corresponding thereto to generate a compressed texture image with a non-rectangular shape, wherein the compressed texture image is further being mapped to the sphere model to generate the 360 degree panoramic video. For example, assuming that the original texture image has N pixel lines and the first pixel line has a first compression ratio, the second pixel line has a second compression ratio, and the third pixel line has a third compression ratio, then the processor 110 samples the first pixel line of the original texture image based on the first compression ratio and the corresponding parameter values to generate a first pixel line of the compressed texture image. Similarly, the processor 110 samples the second and third pixel lines of the original texture image based on the second and third compression ratios and the corresponding parameter values to generate second and third pixel lines of the compressed texture image, respectively, and so on, until the N pixel lines of the original texture image are all sampled by their corresponding compression ratio to get the corresponding pixel lines of the compressed texture image. A compressed texture image with a non-rectangular shape will be generated and finally the new compressed texture image will further be mapped to the sphere model to generate the 360 degree panoramic video.

Specifically, after determining the corresponding parameter values for each pixel line of the compressed texture image, the processor 110 sequentially traverses all pixel positions of the respective pixel lines of the original texture image from left to right and determines a pixel value of the j-th pixel position New[i][j] in the i-th pixel line according to the corresponding parameter value of each pixel line and the corresponding pixel position being traversed. The determination of the pixel value of the j-th pixel position New [i][j] in the i-th pixel line according to the corresponding parameter value of each pixel line and the corresponding pixel position being traversed may comprise the following steps: the processor 110 sets the pixel value of New[i][j] as a black pixel value when j<StartPixel[i] or j>EndPixel[i]; and the processor 110 performs a grouping procedure to divide the i-th pixel line in the original texture image into a plurality of groups based on the corresponding compression ratio of the i-th pixel line in the original texture image and sets the pixel value of New[i][j] as a pixel value of a specified pixel position in the (j-Start [i])-th group among the groups of the i-th pixel line in the original texture image when StartPixel[i]≤j≤EndPixel[i]. The division of the groups is determined according to the compression ratio of the pixel line, and each set of ratio[i] pixels will be set as a group, as shown in FIG. 5.

Figure 5:
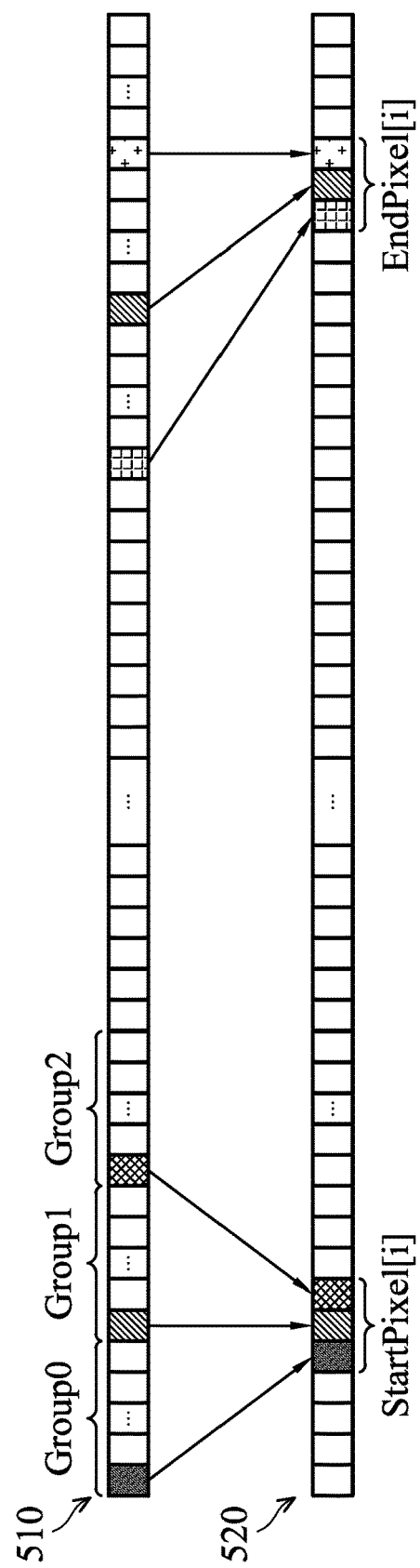
FIG. 5 is a diagram illustrating the results of grouping the original texture image in accordance with an embodiment of the invention.

FIG. 5 is a diagram illustrating a result of grouping the original texture image in accordance with an embodiment of the invention. As shown in FIG. 5, assuming that the i-th line 510 of the original texture image has a total of 100 pixels and the compression ratio of which is 5, the i-th line of the original texture image may be divided into 20 groups by dividing every 5 pixels as a group and the i-th line 520 of the compressed texture image corresponding to the i-th line 510 of the original texture image may be generated based on the result of the grouping, wherein the pixel value of the pixel position StartPixel[i] of the i-th line 520 of the compressed texture image is set as the first pixel value of the zero group (group0 as shown in FIG. 5), and the pixel value of the pixel position StartPixel[i]+1 is set to the first pixel value of the first group (group1 as shown in FIG. 5), the pixel value of the pixel position StartPixel[i]+2 is set to the first pixel value of the second group (group2 as shown in FIG. 5), and so on. Note that variables i, j, StartPixel[i], EndPixel[i], and (j-Start [i]) are counted from zero. Methods of compressing the texture image will be discussed further in the following paragraphs with reference to FIG. 6.

Figure 6:
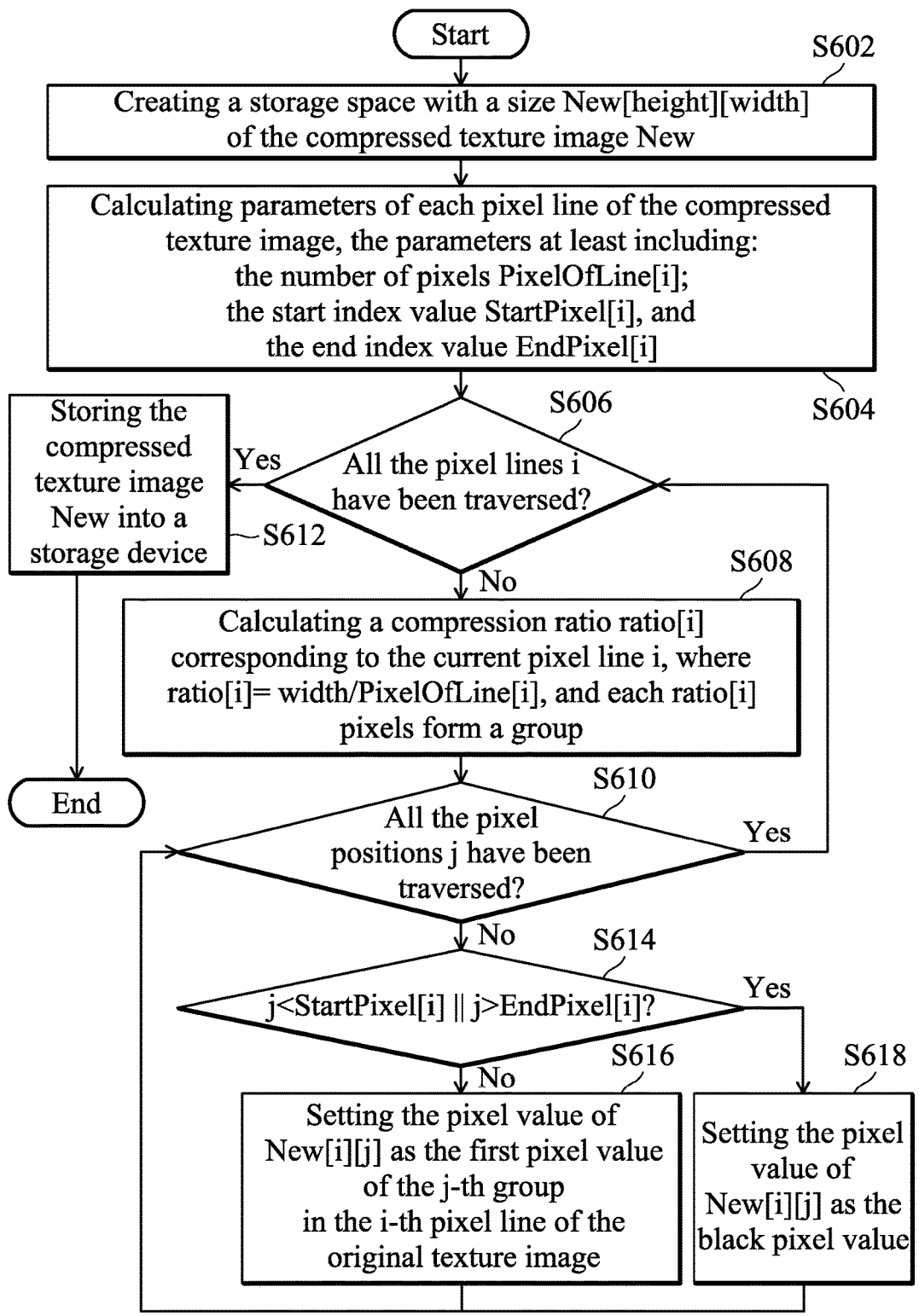
FIG. 6 is a flowchart of a method of compression a texture image in accordance with another embodiment of the invention.

FIG. 6 is a flowchart of a method of compression a texture image in accordance with another embodiment of the invention. Please refer to FIG. 1, FIG. 2, FIG. 3 and FIG. 6. The method of compressing the texture image of the invention may be applied to an image data processing system, such as the image data processing system 100 as shown in FIG. 1 and performed by the processor 110, for example. In this embodiment, the processor 110 may sequentially traverse all the pixel positions of the pixel lines from left to right and determine the pixel value of the j-th pixel position New[i][j] in the i-th pixel line of the compressed texture image based on the corresponding parameter values and the corresponding pixel position being traversed of each respective pixel line in the original texture image.

First, the processor 110 prepares to start compressing the original texture image, and thus, in step S602, creates a storage space with a size New[height][width] of the compressed texture image New. Next, in step S604, the processor 110 calculates the parameters of each pixel line of the compressed texture image, wherein the parameters at least include the number of pixels PixelOfLine[i], the start index value StartPixel[i], and the end index value EndPixel[i] for each pixel line i. In some embodiments, the number of pixels PixelOfLine[i] of each pixel line i may be determined by the height value of each pixel line, the width value, and a circumference of the ring of latitude line corresponding to the pixel line i, as shown in formula (3). In some embodiments, the start index value StartPixel[i] may be determined based on the number of pixels of each pixel line i and the width value, and the end index value EndPixel[i] may be calculated based on the number of pixels and the start index value of each pixel line i, as shown in formulas (4) and (5).

After determining the corresponding parameter value for the pixel lines of the compressed texture image, the processor 110 starts traversing each of the pixel positions of each of the respective pixel lines from left to right, and determines the pixel value of the j-th pixel position New [i][j] of the i-th pixel line according to the corresponding parameter values of the respective pixel line and the respective pixel position being traversed. In step S606, the processor 110 determines whether or not all the pixel lines i have been traversed. If so, it indicates that all the pixels of the original texture image have been compressed, and the processor 110 then proceeds to step S612 to store the compressed texture image New into a storage device (e.g., the storage unit 140). If any pixel line i has not yet been traversed (No in step S604), the processor 110 proceeds to step S608 to calculate the compression ratio ratio[i] corresponding to the current pixel line i, where ratio[i]=width/PixelOfLine[i] (as shown in formula (6)), and every ratio[i] pixels form a group, as shown in FIG. 5.

After calculating the compression ratio ratio[i] corresponding to the current pixel line i, the processor 110 then determines whether all the pixel positions j have been traversed (step S610). If all the pixel positions j of the current pixel line i have been traversed (Yes in step S610), it indicates that the current pixel line i has been completely compressed and processed, so that the processor 110 returns to step S606 to continue to determine whether there are other pixel lines i needed to be processed. If the current pixel line i still has at least one pixel position j has not yet traversed (No in step S610), it indicates that the current pixel line i still has an uncompressed pixel position j, and the processor 110 then performs steps S614 to S618 to determine the pixel value of each pixel position j in the corresponding pixel line according to the start index value StartPixel[i] and the end index value EndPixel[i] of each line i and the pixel position j of each pixel.

As shown in step S614, the processor 110 determines whether the value of the pixel position j is smaller than the value of the pixel position corresponding to the start index value StartPixel[i] or the value of the pixel position j is greater than the pixel value of the pixel position corresponding to the end index value EndPixel[i]. If it is determined that the condition of step S614 is satisfied (i.e., "j<StartPixel[i]||j>EndPixel[i]"), the processor 110 performs step S618, and the processor 110 performs step S616 if it is determined that the condition of step S614 is not satisfied. When the value of the pixel position j is smaller than the value of the pixel position corresponding to the start index value StartPixel[i] or the value of the pixel position j is greater than the pixel value of the pixel position corresponding to the end index value EndPixel[i] (i.e., j<StartPixel[i] or j>EndPixel[i]) (Yes in step S614), in step S618, the processor 110 sets the pixel value of New[i][j] as the black pixel value. When the value of the pixel position j is a value between the start index value StartPixel[i] and the end index value EndPixel[i] (No in step S614), in step S616, the processor 110 performs a grouping procedure as shown in FIG. 5 to divide the i-th pixel line in the original texture image into a plurality of groups based on the corresponding compression ratio of the i-th pixel line corresponding to the start index value StartPixel[i] and sets the pixel value of New[i][j] as a pixel value of a specified pixel position in a corresponding one of the groups of the i-th pixel line in the original texture image, such as setting the pixel value of New [i][j] to the first pixel value of the j-th group in the i-th pixel line of the original texture image. Steps S614, S616, and S618 are repeated until all the pixel positions j of the pixel line i have been completely traversed.

For example, assuming that the width value width of the original texture image is set as 360 and the value of the number of pixels PixelOfLine[i] for the i-th pixel line of the compressed texture image calculated by the formula (3) is set as 180, its start index value StartPixel[i], end index value EndPixel[i] and compression ratio ratio[i] can be calculated as 90, 269, and 2 by the formulas (4), (5) and (6), respectively. That is, in this embodiment, 360 pixels in the i-th line of the original texture image are grouped into 180 groups by dividing each two pixels as a group, wherein the number of pixels for the i-th pixel line of the compressed texture image corresponding to the i-th pixel line of the original texture image is 180 pixels and, in the i-th pixel line of the compressed texture image, the pixel value of the pixel position represented by the start index value of the i-th pixel line of the compressed texture image (i.e., the 90th pixel position) is set to be the first pixel value of the 0th group in the i-th line of the original texture image, the pixel value of the 91th pixel position is set to be the first pixel value of the first group in the i-th line of the original texture image, the pixel value of the 92th pixel position is set to be the first pixel value of the second group in the i-th line of the original texture image and so on. The pixel values for the pixel positions located before the 89th pixel position are all set to be the black pixel values, and the pixel values for the pixel positions located after the 270th pixel position are also set to the black pixel values. As a result, the number of effective pixels required to be stored in the i-th line of the compressed texture image is only half of the number of effective pixels within the i-th line of the original texture image, thus effectively reducing the number of pixels within the effective texture range.

Figure 7:
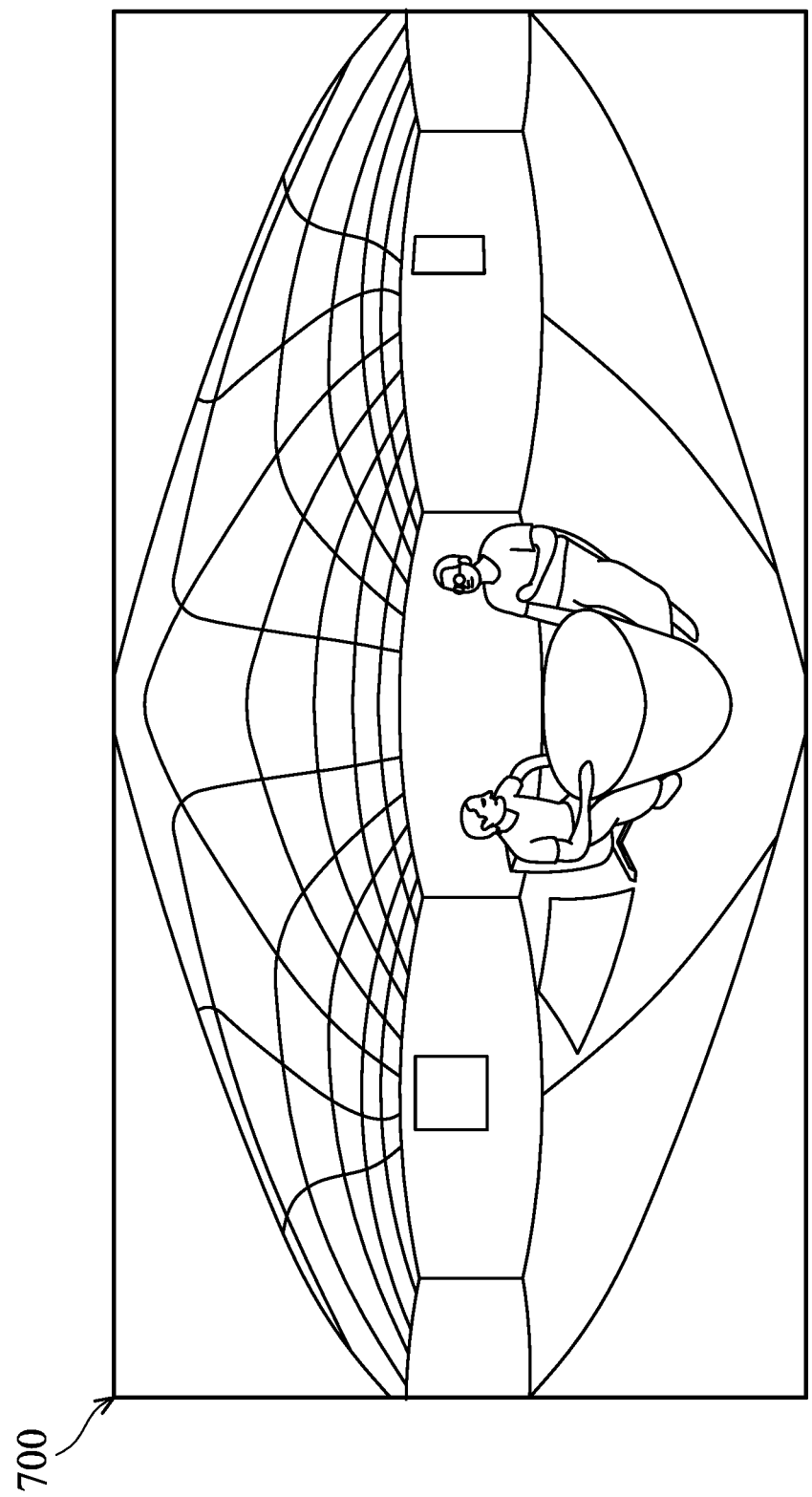
FIG. 7 is a diagram of a compressed texture image in accordance with an embodiment of the invention.

FIG. 7 is a diagram of a compressed texture image 700 in accordance with an embodiment of the invention, wherein the compressed texture image 700 represents the compression result of the original texture image 200. Please refer together to FIG. 2 and FIG. 7. As shown in FIG. 7, in the compressed texture image 700, the compression ratio for each pixel line is determined according to a size of the circumference for a ring of latitude line on the sphere corresponding to the corresponding spherical position on the sphere for a respective pixel line of the original texture image 200, wherein the corresponding compression ratio of the first pixel line whose corresponding spherical position is close to one of two poles of the sphere model is greater than the corresponding compression ratio of the second pixel line whose corresponding spherical position is far away from the two poles of the sphere model, thereby compressing the originally used rectangular texture image into an approximately elliptical texture image. Compared with FIG. 2 and FIG. 7, it can be seen that the number of pixels in the effective texture range for the compressed texture image 700 that is generated by compressing the original texture image 200 is about 68% of that of the original texture image 200. Thus, the method of compressing the texture image of the invention can determine the number of pixels on each pixel line of a compressed texture image with a non-rectangular shape based on the circumference of the ring of latitude line corresponding thereto on the sphere, such that only a few necessary information is stored for points of the texture image which located near the North and South poles of the sphere model, thus effectively solving the problem that too much redundant information of the texture image may be obtained at the North and South poles of the sphere model in the prior art.

Another embodiment of the present invention may further provide a method of generating a 360 degree panoramic video by using the aforementioned compressed texture image. In this embodiment, the compressed texture image is mapped to a corresponding position of a sphere model to construct a sphere model using the compressed texture image with the non-rectangular shape to generate the 360 degree panoramic video for 360 degree panoramic video playback.

Figure 8A:
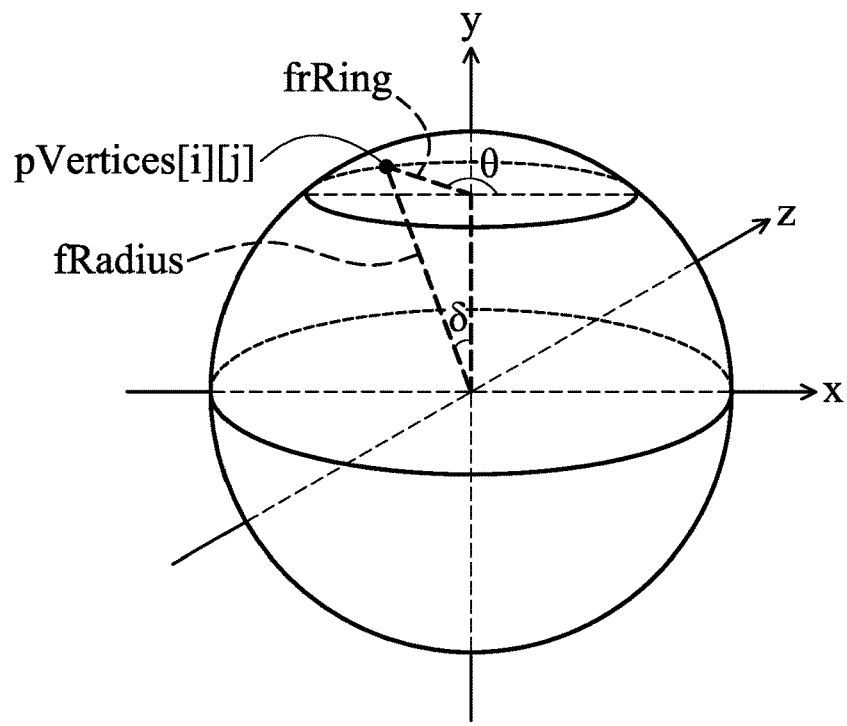
FIGS. 8A, 8B, and 8C are diagrams illustrating the construction of a sphere model in accordance with an embodiment of the invention.
Figure 8B:
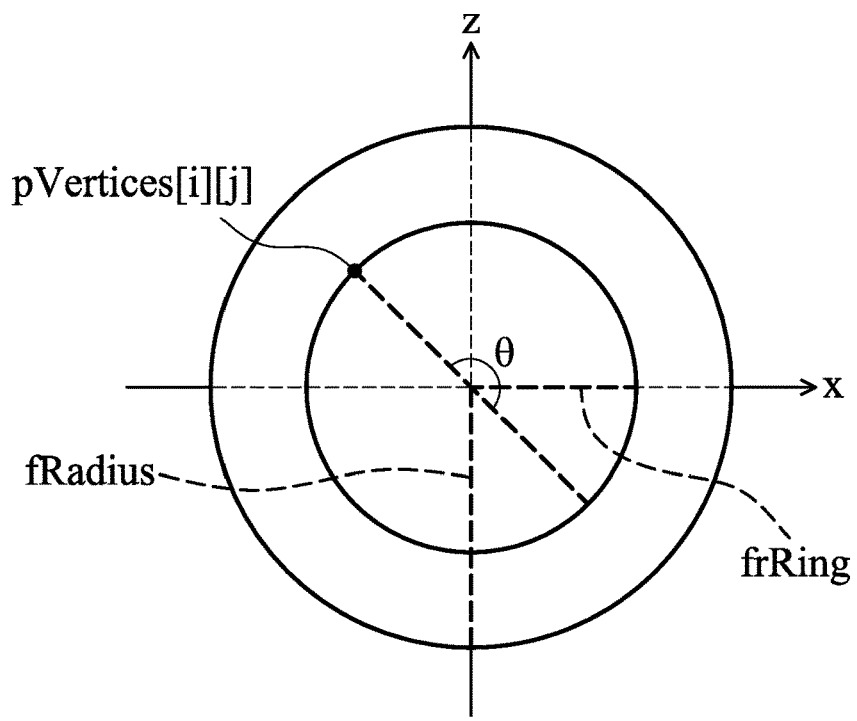
Figure 8C:
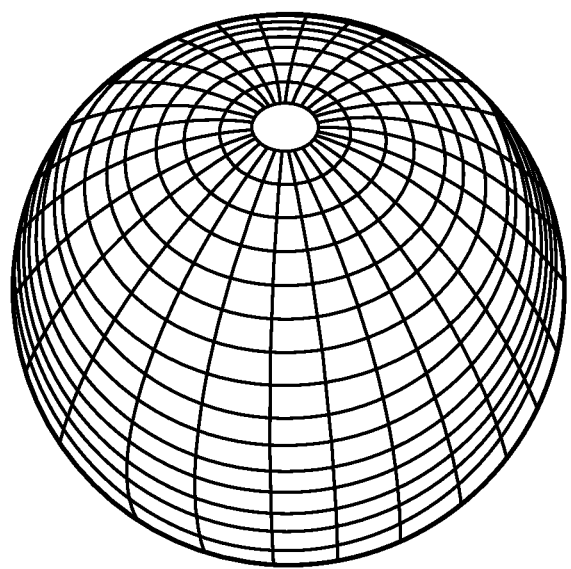

As parameter values of each pixel line have to be calculated first in order to perform a texture coordinates mapping when applying to the compressed texture image with the non-rectangular shape to construct a sphere model to generate a 360 degree panoramic video, the sphere model must be first constructed. Please refer to FIGS. 8A, 8B, and 8C. FIGS. 8A, 8B, and 8C are diagrams illustrating the construction of a sphere model in accordance with some embodiments of the invention. FIG. 8A is a schematic diagram of a coordinate system of the sphere model. FIG. 8B is a schematic diagram illustrating a viewing result of the spherical model of FIG. 8A viewed vertically from the positive direction of the y-axis, and FIG. 8C is a schematic diagram of vertices of subdivision triangles generated by the intersections of the latitude and longitude lines on the sphere model.

As shown in FIG. 8A, in order to construct a sphere model, the GPU 130 first divides the spheres into iRings pieces along the direction of latitude line and divides the spheres into iSectors pieces along the direction of longitude line, so that there are a total of iRings latitude lines and a total of iSectors longitude lines crossed each other on the sphere. Assuming that pVertices[i][j] represents the intersection point of the i-th latitude line and the j-th longitude line, parameters of the sphere model, which includes the intersection coordinates (x, y, z) and the intersection texture coordinates (u, v), can be calculated using the following formula for the construction of the sphere model and the sampling of the texture image. Note that PixelLineOfRing[i] represents a pixel line of the texture image corresponding to the i-th latitude line, fRadius is the radius of the sphere, and frRing[i] is the radius of the i-th ring of latitude line, as shown in FIG. 8A and FIG. 8B. Each iRing intersects iSector to form a subdivision triangle whose vertex coordinates are the coordinates pVertices [i][j] of the intersection point, and the spherical model shown in FIG. 8C can be constructed using all of the intersection coordinates, and attributes of texture coordinates of the subdivided triangles on the sphere can be set based on the pre-calculated parameter values StartPixel[i] and PixelOfLine[i] of each respective pixel line on the compressed texture image.

First, the processor 110 calculates a first angle θ as shown in the FIG. 8A based on the number of divided longitude lines iSector and the number of divided latitude lines by the following formula (7):

$$\theta = j * \frac{2\pi}{(iSector - 1)}. \tag{7}$$

The processor 110 then determines a pixel line PixelLineOfiRing[i] on the texture image corresponding to the i-th latitude line based on the height value height and the number of divided latitude lines iRings by the following formula (8), in which pixel values of pixel points on the i-th latitude line are sampled from this pixel line:

$$PixelLineOfiRing[i] = i * \frac{height}{iRings}. \tag{8}$$

The processor 110 then calculates a second angle δ by the following formula (9) according to the pixel line PixelLineOfiRing[i] on the texture image corresponding to the i-th latitude and the height value height:

$$\delta = \pi * \frac{PixelLineOfiRing[i]}{(height - 1)}. \tag{9}$$

The processor 110 may then calculate a radius frRing[i] of the i-th ring of latitude line by the following formula (10) according to the second angle δ and the sphere radius:

$$frRing[i] = fRadius * \sin(\delta) \tag{10}.$$

Thereafter, the processor 110 calculates a three-dimensional sphere coordinates (x, y, z) for the intersection point pVertices[i][j] based on the radius of the i-th ring of latitude line, the first angle, the second angle and the sphere radius by the following formulas (11)-(13):

$$p\text{Vertices}[i][j].x = frRing * \sin(\theta) \tag{11};$$

$$p\text{Vertices}[i][j].y = fRadius * \cos(\delta) \tag{12}; \text{ and}$$

$$p\text{Vertices}[i][j].z = frRing * \cos(\theta) \tag{13}.$$

Next, the processor 110 further calculates a pixel index value (PixelIndexInLine[j]) within the pixel line on the texture image corresponding to the i-th latitude line for the intersection point pVertices[i][j] based on the start index value (StartPixel[i]) of the corresponding pixel line and the number of pixels (PixelOfLine[i]) for the pixel line on the texture image corresponding to the i-th latitude line by the following formula (14):

$$PixelIndexInLine[j] = \begin{cases} \left( j * \dfrac{PixelOfLine[PixelLineOfiRing[i]]}{(iSectors-1)} + StartPixel[PixelLineOfiRing[i]] \right), & j \neq (iSectors-1) \\ \left( j * \dfrac{PixelOfLine[PixelLineOfiRing[i]]}{(iSectors-1)} + StartPixel[PixelLineOfiRing[i]] - 1 \right), & j = (iSectors-1) \end{cases} \quad (14)$$

Wherein, PixelLineOfiRing[i] represents the line number (i.e., line index value) of this point; PixelOfLine[PixelLineOfiRing[i]] represents the number of pixels in the pixel line PixelLineOfiRing[i] (also referred to as the number of effective pixels);

$$\dfrac{PixelOfLine[PixelLineOfiRing[i]]}{(iSectors-1)}$$

represents that the number of effective pixels within this line are being divided into (iSectors-1) pieces;

$$j * \dfrac{PixelOfLine[PixelLineOfiRing[i]]}{(iSectors-1)}$$

is calculated by first obtaining an index value within the effective pixels of the corresponding point (in which the index value of the first effective pixel value is set to be 0) and then calculating a coordinate index value PixelIndexInLine [j] in the pixel line (including invalid pixels) on which the corresponding point located based on the coordinates StartPixel[PixelLineOfiRing[i]] of the first effective pixel point, and the intersection point pVertices[i][j] can be mapped to a point on the texture image. It should be understood that formulas illustrated above are only an example method for calculating the coordinates of the corresponding point on the texture image, but the invention is not limited thereto.

Finally, the processor 110 calculates the value u of the texture coordinates (u,v) based on the pixel index value (PixelIndexInLine[j]) within the pixel line on the texture image corresponding to the i-th latitude line for the intersection point pVertices[i][j] and the width value width by the following formula (15) and calculates the value v of the texture coordinates (u,v) based on the pixel line (PixelLineOfiRing [i]) on the texture image corresponding to the i-th latitude line for the intersection point pVertices[i][j] and the height value height by the following formula (16):

$$pVertices[i][j] \cdot u = \dfrac{PixelIndexInLine[j]}{(width-1)}; \quad (15)$$

and $$pVertices[i][j] \cdot v = \dfrac{PixelLineOfiRing[i]}{(height-1)}. \quad (16)$$

Thereafter, the GPU 130 may determine a correspondence relationship between the spherical coordinates (x,y,z) of the respective intersection point calculated by the formulas (11) to (13) and the mapping texture coordinates (u,v) calculated by the formulas (15) to (16) and utilize the compressed texture image as the texture image for the sphere model to map each point of the compressed texture image into a corresponding position of the sphere model based on the determined correspondence relationship, so as to generate the 360 degree panoramic video.

Figure 9:
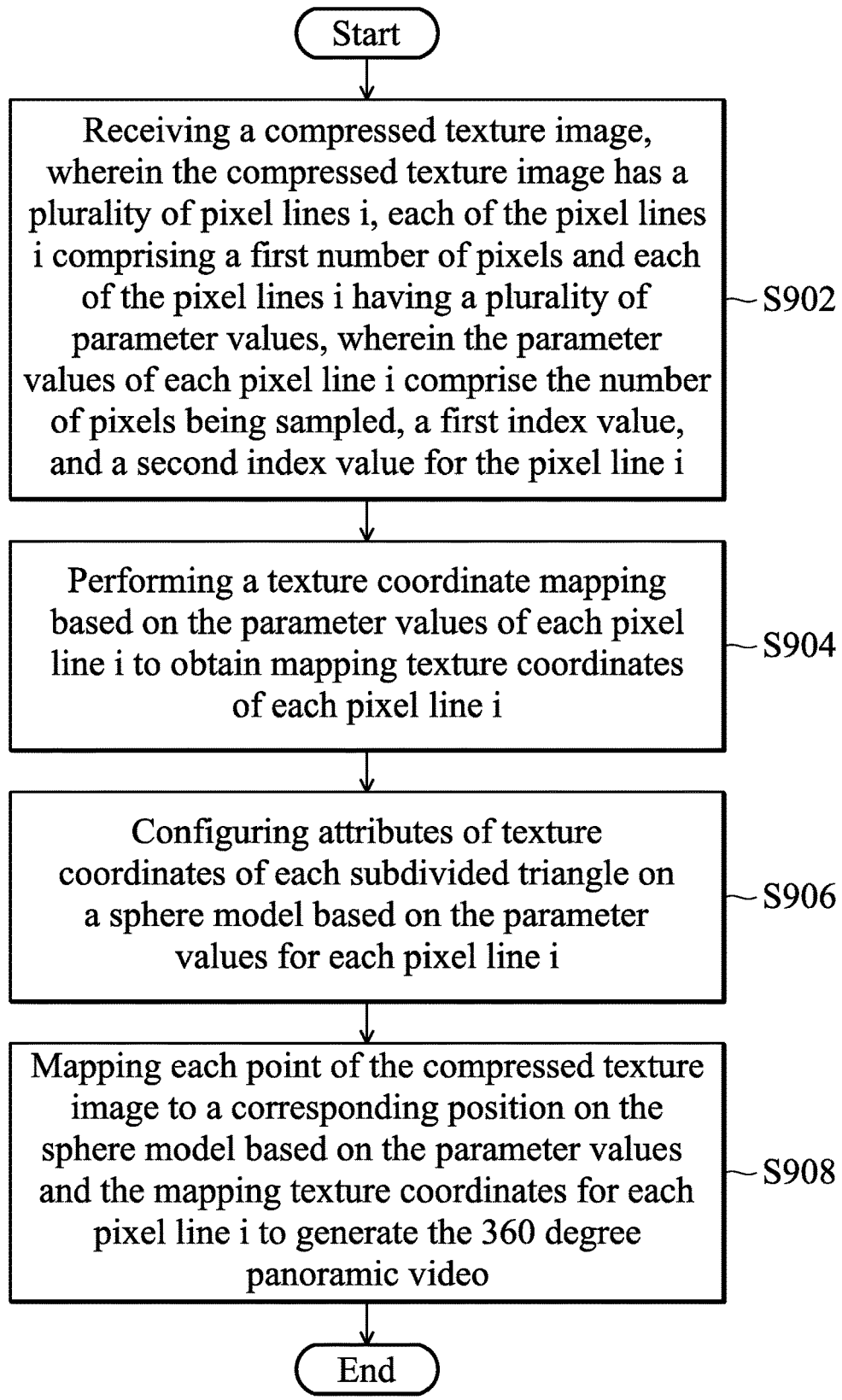
FIG. 9 is a flow chart of a method of generating a 360-degree panoramic video in accordance with an embodiment of the invention.

FIG. 9 is a flow chart of a method of generating a 360-degree panoramic video in accordance with an embodiment of the invention. Please refer to FIG. 1, FIG. 7, FIGS. 8A, 8B and 8C and FIG. 9. The method of generating the 360-degree panoramic video of the invention may be applied to an image data processing system, such as the image data processing system 100 as shown in FIG. 1 and may be performed by the processor 110 or the GPU 130, for example. It should be understood that image data processing system 100 of FIG. 1 is utilized here for explanation of the flow chart, which however, is not limited to only being applied in the image data processing system 100. In this embodiment, the processor 110 or the GPU 130 may obtain a non-rectangular compressed texture image (e.g., the compressed texture image 700 as shown in FIG. 7) from a storage unit (e.g., the storage unit 140) and map the compressed texture image to the sphere model to generate the 360 degree panoramic video.

First, in step S902, the GPU 130 receives a compressed texture image, wherein the compressed texture image has a plurality of pixel lines i, each of the pixel lines i comprising a first number of pixels and each of the pixel lines i having a plurality of parameter values, wherein the parameter values of each pixel line i comprise the number of pixels being sampled, a first index value, and a second index value for the pixel line i. Specifically, in this embodiment, the compressed texture image is a non-rectangular texture image (e.g., the compressed texture image 700 as shown in FIG. 7), in which each pixel line i of the compressed texture image may have a different number of pixels and it may also have different storage position of the effective pixels. Therefore, each pixel line i has the number of pixels being sampled, a start index value (i.e., a first index value) and an end index value (i.e., a second index value) corresponding thereto, wherein the start index value and the end index value of each pixel line represent the starting pixel position and the ending pixel position of the effective pixels stored in the corresponding pixel line, respectively. That is, the start index value and the end index value represent an effective pixel sampling range of the i-th pixel line. These parameter values may be recorded together in the storage unit 140 during generating the compressed texture image so that the processor 110 may later read the compressed texture image from the storage unit 140 to receive the compressed texture image and read the relevant records directly to obtain the aforementioned parameter values. In another embodiment, the processor 110 may analyze the parameter values of the pixel lines of the compressed texture image received and filter out the pixels with a predetermined fixed pixel value (e.g., black pixel values) to obtain the aforementioned parameter values.

Next, in step S904, the processor 110 performs a texture coordinate mapping based on the parameter values of each pixel line i to obtain mapping texture coordinates of each pixel line i. After the mapping texture coordinates of each pixel line i are obtained, in step S906, the processor 110 configures attributes of texture coordinates of each subdivided triangle on a sphere model based on the parameter values for each pixel line i. In this step, the processor 110 may calculate the value u of the respective mapping texture coordinates (u,v) based on the pixel index value PixelIndexInLine[j] within the pixel line on the texture image corresponding to the i-th latitude line for the intersection point pVertices[i][j] and the width value width and calculates the value v of the respective texture coordinates (u,v) based on the pixel line PixelLineOfiRing [i] on the texture image corresponding to the i-th latitude line for the intersection point pVertices[i][j] and the height value height according to aforementioned formulas (7)-(14). For example, the processor 110 may obtain the mapping texture coordinates (u, v) by aforementioned formulas (15)-(16), but the invention is not limited thereto.

After configuring the attributes of the texture coordinates of the subdivided triangles on the sphere model, in step S908, the GPU 130 maps each point of the compressed texture image to a corresponding position on the sphere model based on the parameter values and the mapping texture coordinates for each pixel line i to generate the 360 degree panoramic video. In this step, the GPU 130 may determine a correspondence relationship between the spherical coordinates (x, y, z) and the respective mapping texture coordinates (u,v) for each intersection point and utilize the compressed texture image as the texture image for the sphere model to map each point of the compressed texture image into a corresponding position of the sphere model based on the determined correspondence relationship, so as to generate the 360 degree panoramic video.

Figure 10:
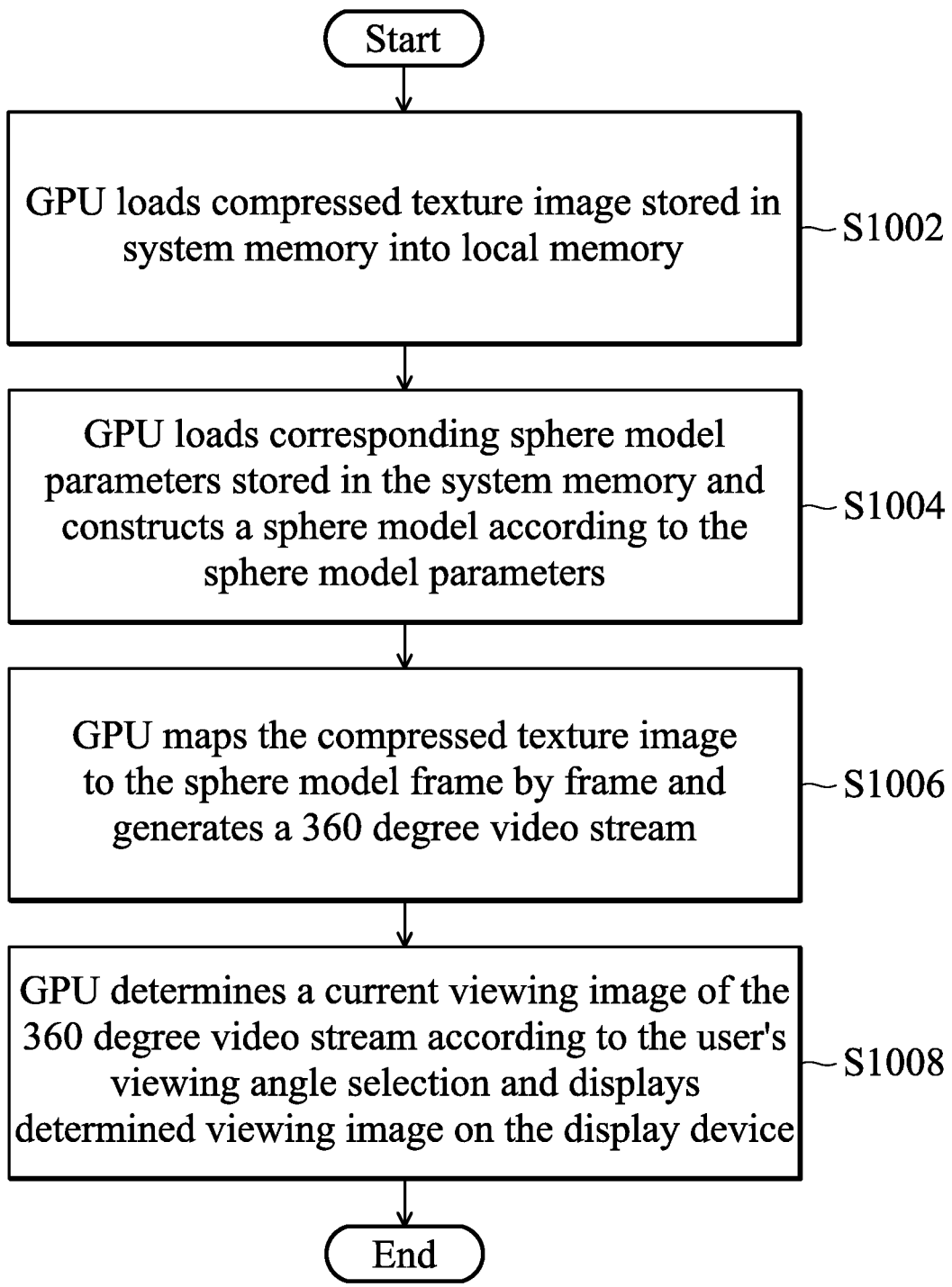
FIG. 10 is a flowchart of a playback method for a 360 degree panoramic video in accordance with an embodiment of the invention.

FIG. 10 is a flowchart of a playback method for a 360 degree panoramic video in accordance with an embodiment of the invention. The playback method for the 360 degree panoramic video of the invention may be applied to an image data processing system, such as the image data processing system 100 as shown in FIG. 1 and may be performed by a GPU such as the GPU 130, for example. It should be understood that image data processing system 100 of FIG. 1 is utilized here for explanation of the flow chart, which however, is not limited to only being applied in the image data processing system 100. In this embodiment, it is assumed that the storage unit 140 may further include a system memory (not shown) and the system memory stores a compressed texture image with a non-rectangular shape generated by the processor 110 (such as the compressed texture image 700 as shown in FIG. 7) and the corresponding sphere model parameters. The GPU may read the compressed texture image with a non-rectangular shape from the system memory, load it into the built-in local memory of the GPU, map the compressed texture image to a sphere model of the corresponding sphere parameters to generate a 360 degree panoramic video and then select a current viewing image from the 360 degree panorama video based on a user's viewing angle selection and display the current viewing image on the display device 150.

First, in step S1002, the GPU loads the compressed texture image in the system memory into its local memory.

After the compressed texture image has been loaded into the local memory, in step S1004, the GPU loads the corresponding sphere model parameters stored in the system memory and constructs a sphere model (as shown in FIG. 8C) according to the sphere model parameters.

In step S1006, the GPU maps the compressed texture image to the sphere model frame by frame and generates a 360 degree video stream as a 360 degree panoramic video, wherein the 360 degree video stream is a set of 360 degree video data in both horizontal and vertical directions.

After the 360 degree video stream has been generated, the viewing angle of the user is preset at the center position and the current viewing image is a default image corresponding to the center position. When the viewer changes the viewing angle, a user's viewing angle selection will be generated. When the GPU receives the user's viewing angle selection, it indicates that the user wants to change the currently viewing image. Accordingly, in step S1008, the GPU determines a current viewing image of the 360 degree video stream according to the user's viewing angle selection and displays the determined viewing image on the display device 150. By doing so, the GPU can map between the compressed texture image generated by the method of compressing the texture image of the invention and the sphere model to generate the 360 degree video stream and change the current viewing image being displayed as the user's viewing angle changes, thus achieving a 360-degree panoramic video playback.

Therefore, according to methods of compressing the texture image and associated image data processing systems and methods of generating the 360 degree panoramic video of the present invention, a compression ratio of each of pixel lines on the texture image can be determined according to the different circumferences of rings of latitude line of the respective pixels on the sphere to compress original texture image which is a texture image with a rectangular shape utilized in the prior art into a texture image with an non-rectangular shape such that the number of effective pixels stored in the compressed texture image can be significantly reduced, thus effectively solving the problem of excessive redundancy information sampled at the North and South poles of the texture image in the prior art, obtaining unity in the texture pixel resolution on the sphere, and achieving a goal for reducing the information redundancy on the texture image and reducing the bandwidth required for transmission. Moreover, the method of generating the 360 degree panoramic video of the present invention can further apply a compressed non-rectangular texture image to construct a sphere model and thereby generate a 360 degree panoramic video and change current viewing image being displayed as the user's viewing angle changes, thus achieving a 360-degree panoramic video playback.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of compressing a texture image for use in generating a 360 degree panoramic video, comprising:
   receiving an original texture image for a sphere model, wherein the original texture image is an image with a rectangular shape and includes a plurality of pixel lines and each of the pixels lines has a corresponding spherical position on the sphere model;
   determining a corresponding compression ratio of each of the pixel lines according to the corresponding spherical position of each of the pixel lines; and
   compressing the pixel lines with the compression ratios corresponding thereto to generate a compressed texture image with a non-rectangular shape, wherein the compressed texture image is further being mapped to the sphere model to generate the 360 degree panoramic video;
   wherein the original texture image has a height value and a width value and the sphere model is divided into a plurality of rings of latitude line along the latitude line direction, and the step of determining the corresponding compression ratio of each of the pixel lines according to the corresponding spherical position of each of the pixel lines further comprises, for each pixel line:
   determining a corresponding ring of latitude line among the rings of latitude line according to the corresponding spherical position of each pixel line;
   determining the number of pixels based on the height value, the width value, and the circumference of the corresponding ring of latitude line; and
   determining the corresponding compression ratio of each pixel line according to the number of pixels of each pixel line and the width value, wherein the corresponding compression ratio of each pixel line is inversely proportional to the number of pixels of each pixel line.

2. The method of compressing a texture image of claim 1, wherein the pixel lines comprise at least one first pixel line whose corresponding spherical position is close to one of two poles of the sphere model and one second pixel line whose corresponding spherical position is far away from the two poles of the sphere model, and the corresponding compression ratio of the first pixel line is greater than the corresponding compression ratio of the second pixel line.

3. The method of compressing a texture image of claim 1, further comprising:
   determining a start index value for each pixel line based on the number of pixels of each pixel line and the width value;
   determining an end index value for each pixel line based on the number of pixels and the start index value of each pixel line,
   wherein each pixel line has a corresponding pixel line in the compressed texture image, and the start index value and the end index value for each pixel line represent a start pixel position and an end pixel position of effective pixels stored in the corresponding pixel line, respectively.

4. The method of compressing a texture image of claim 3, wherein the corresponding pixel line for each pixel line comprises a plurality of pixels and each pixel has a respective pixel position, and the method further comprises:
   determining a pixel value for the respective pixel position of each pixel in the corresponding pixel lines based on the start index value and the end index value of each pixel line and the respective pixel position of the pixel.

5. The method of compressing a texture image of claim 4, wherein the step of determining the pixel value for the respective pixel position of each pixel in the corresponding pixel lines based on the start index value and the end index value of each pixel line and the respective pixel position of the pixel further comprises, for the respective pixel position of each pixel:
   setting the pixel value as a black pixel value when a value of the respective pixel position is smaller than the start index value or the value of the respective pixel position is greater than the end index value.

6. The method of compressing a texture image of claim 5, further comprising:
   performing a grouping procedure to divide the pixel line corresponding to the start index value into a plurality of groups based on the corresponding compression ratio of the pixel line corresponding to the start index value and setting the pixel value as a pixel value of a specified pixel position in a corresponding one of the groups when the value of the respective pixel position is a value between the start index value and the end index value.

7. An image data processing system, at least comprising:
   a storage unit, configured to store at least one original texture image for a sphere model, wherein the original texture image is an image with a rectangular shape and includes a plurality of pixel lines and each of the pixels lines has a corresponding spherical position on the sphere model; and
   a processor coupled to the storage unit, configured to receive the original texture image, determine a corresponding compression ratio of each of the pixel lines according to the corresponding spherical position of each of the pixel lines, and compress the pixel lines with the compression ratios corresponding thereto to generate a compressed texture image with a non-rectangular shape and store the compressed texture image into the storage unit;
   wherein the original texture image has a height value and a width value and the sphere model is divided into a plurality of rings of latitude line along the latitude line direction, and the processor further determines the corresponding compression ratio of each of the pixel lines according to the corresponding spherical position of each of the pixel lines by: determining, for each pixel line, a corresponding ring of latitude line among the rings of latitude line according to the corresponding spherical position of each pixel line; determining the number of pixels based on the height value, the width value, and the circumference of the corresponding ring of latitude line; and determining the corresponding compression ratio of each pixel line according to the number of pixels of each pixel line and the width value, wherein the corresponding compression ratio of each pixel line is inversely proportional to the number of pixels of each pixel line.

8. The image data processing system of claim 7, further comprising a graphics processing unit coupled to the storage unit for obtaining the compressed texture image from the storage unit and mapping the compressed texture image into the sphere model to generate a 360 degree panoramic video.

9. The image data processing system of claim 8, further comprising a display device coupled to the graphics processing unit, wherein the graphics processing unit further determines a current viewing image of the 360 degree panorama video based on a user's viewing angle selection, and displays the determined viewing image on the display device.

10. The image data processing system of claim 7, wherein the pixel lines comprise at least one first pixel line whose corresponding spherical position is close to one of two poles of the sphere model and one second pixel line whose corresponding spherical position is far away from the two poles of the sphere model, and the corresponding compression ratio of the first pixel line is greater than the corresponding compression ratio of the second pixel line.

11. The image data processing system of claim 7, wherein the processor further determines a start index value for each pixel line based on the number of pixels of each pixel line and the width value and determines an end index value for each pixel line based on the number of pixels and the start index value of each pixel line, wherein each pixel line has a corresponding pixel line in the compressed texture image, and the start index value and the end index value for each pixel line represent a start pixel position and an end pixel position of effective pixels stored in the corresponding pixel line, respectively.

12. The image data processing system of claim 11, wherein the corresponding pixel line for each pixel line comprises a plurality of pixels and each pixel has a respective pixel position, and the processor further determines a pixel value for the respective pixel position of each pixel in the corresponding pixel lines based on the start index value and the end index value of each pixel line and the respective pixel position of the pixel.

13. The image data processing system of claim 12, wherein the processor further determines the pixel value for the respective pixel position of each pixel in the corresponding pixel lines based on the start index value and the end index value of each pixel line and the respective pixel position of the pixel by: setting, for the respective pixel position of each pixel, the pixel value as a black pixel value when a value of the respective pixel position is smaller than the start index value or the value of the respective pixel position is greater than the end index value.

14. The image data processing system of claim 13, wherein the processor further performs a grouping procedure to divide the pixel line corresponding to the start index value into a plurality of groups based on the corresponding compression ratio of the pixel line corresponding to the start index value and sets the pixel value as a pixel value of a specified pixel position in a corresponding one of the groups when the value of the respective pixel position is a value between the start index value and the end index value.

* * * * *